(12) United States Patent
Ho et al.

(10) Patent No.: US 7,797,027 B2
(45) Date of Patent: Sep. 14, 2010

(54) CONNECTING MECHANISM AND ELECTRONIC DEVICE

(75) Inventors: San-Chi Ho, Taoyuan (TW); Ko-Min Wang, Taoyuan (TW); I-Cheng Chuang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 931 days.

(21) Appl. No.: 11/600,881

(22) Filed: Nov. 17, 2006

(65) Prior Publication Data

US 2007/0155446 A1 Jul. 5, 2007

(30) Foreign Application Priority Data

Dec. 29, 2005 (TW) .............................. 94147229 A

(51) Int. Cl.
*H04M 1/00* (2006.01)
(52) U.S. Cl. .................................................. 455/575.3
(58) Field of Classification Search ............... 455/575.5, 455/575.1, 550, 415, 509, 90.3, 569.1, 569.2, 455/575.8, 128, 566.1, 557, 575.3
See application file for complete search history.

(56) References Cited

U.S. PATENT DOCUMENTS

| | | | |
|---|---|---|---|
| 6,151,206 A | 11/2000 | Kato et al. | |
| 6,341,061 B1 * | 1/2002 | Eisbach et al. | 361/679.46 |
| 6,701,166 B2 * | 3/2004 | Lim | 455/575.3 |
| 6,704,585 B1 * | 3/2004 | Hiebel | 455/575.3 |
| 6,862,432 B1 * | 3/2005 | Kim | 455/80 |
| 7,225,002 B2 * | 5/2007 | Lee et al. | 455/575.4 |
| 7,239,505 B2 * | 7/2007 | Keely et al. | 361/679.09 |
| 7,450,173 B2 * | 11/2008 | Im et al. | 348/373 |
| 7,499,737 B2 * | 3/2009 | Mizuta et al. | 455/575.3 |
| 7,636,748 B2 * | 12/2009 | Duarte et al. | 709/201 |

FOREIGN PATENT DOCUMENTS

| | | |
|---|---|---|
| CN | 1200202 A | 11/1998 |
| CN | 1213099 A | 4/1999 |
| CN | 2475072 Y | 1/2002 |
| CN | 2554692 Y | 6/2003 |
| TW | 530970 Y | 5/2003 |
| TW | M280609 | 11/2005 |

* cited by examiner

*Primary Examiner*—Melody Mehrpour
(74) *Attorney, Agent, or Firm*—Birch, Stewart, Kolasch & Birch, LLP

(57) ABSTRACT

An electronic device includes a body, an input device and a connecting mechanism. The connecting mechanism includes a first connector and a second connector installed on the body and the input device, respectively. The connectors are connected via a magnetic interaction. When the electronic device approaches the input device, the electronic device is fixed on the input device by the magnetic interaction.

4 Claims, 4 Drawing Sheets

CONNECTING MECHANISM AND ELECTRONIC DEVICE

BACKGROUND OF THE INVENTION

1. Field of the Invention

The present invention relates to a connecting mechanism and an electronic device, and in particular relates to a connecting mechanism for connecting to an electronic device and other electronic devices or an input/output device.

2. Description of the Related Art

A connecting mechanism typically connects to two electronic devices or connects to an electronic device and an input/output device. Referring to FIG. 1, the electronic device, for example, a personal digital assistant (PDA) 20 can electrically connect to other electronic devices such as a digital camera or an input/output device such as a keypad. Referring to FIG. 1, the personal digital assistant (PDA) 20 has a pogopin 201 (shown in FIG. 2). The pogopin 201 comprises a head portion 202 and a tip portion 203. The tip portion 203 can retract into the pogopin 201. The keypad 21 comprises a connector 211. The connector 211 is a notch for containing the tip portion 203 of the pogopin 201. When a user uses the personal digital assistant (PDA) 20 with the keypad 21, the pogopin 201 is inserted into the connector 211.

It is inconvenient for a user to exert an interaction on a conventional electronic device to connect to other electronic devices or an input/output device.

BRIEF SUMMARY OF INVENTION

A detailed description is given in the following embodiments with reference to the accompanying drawings.

An electronic device includes a body, an input device and a connecting mechanism. The connecting mechanism comprises a first connector and a second connector installed on the body and the input device, respectively. The connectors are connected via a magnetic interaction. When the electronic device approaches the input device, the electronic device is fixed on the input device by the magnetic interaction.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

A connecting mechanism connects two electronic devices or connects to an electronic device and an input device/output.

Figure 1:
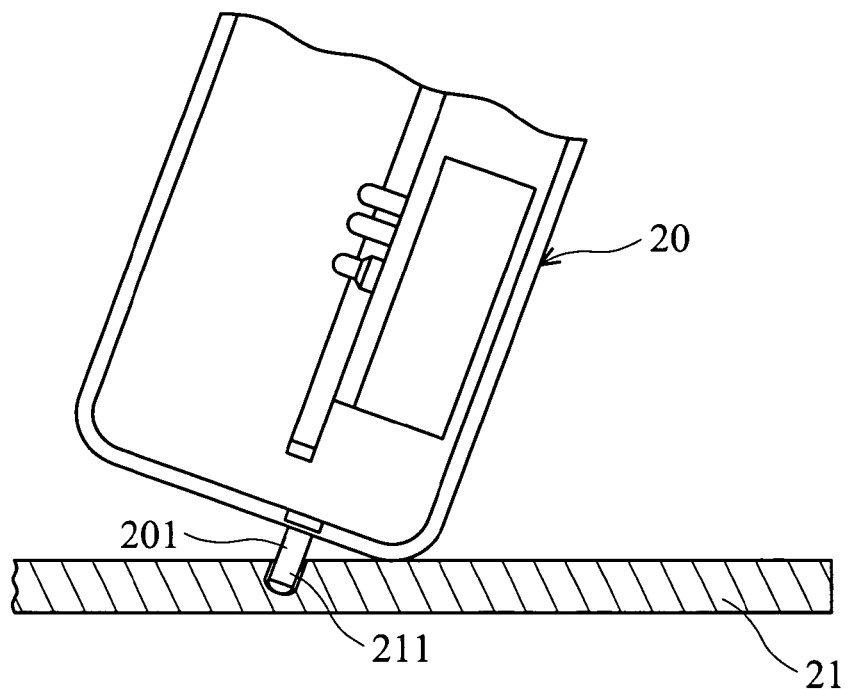
FIG. 1 is a schematic view showing a conventional electronic device connected to an input device.
Figure 2:
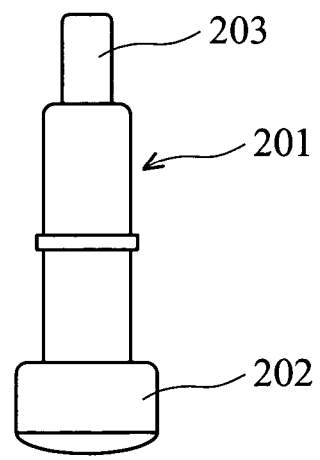
FIG. 2 is a schematic view of a conventional connecting mechanism.
Figure 3:
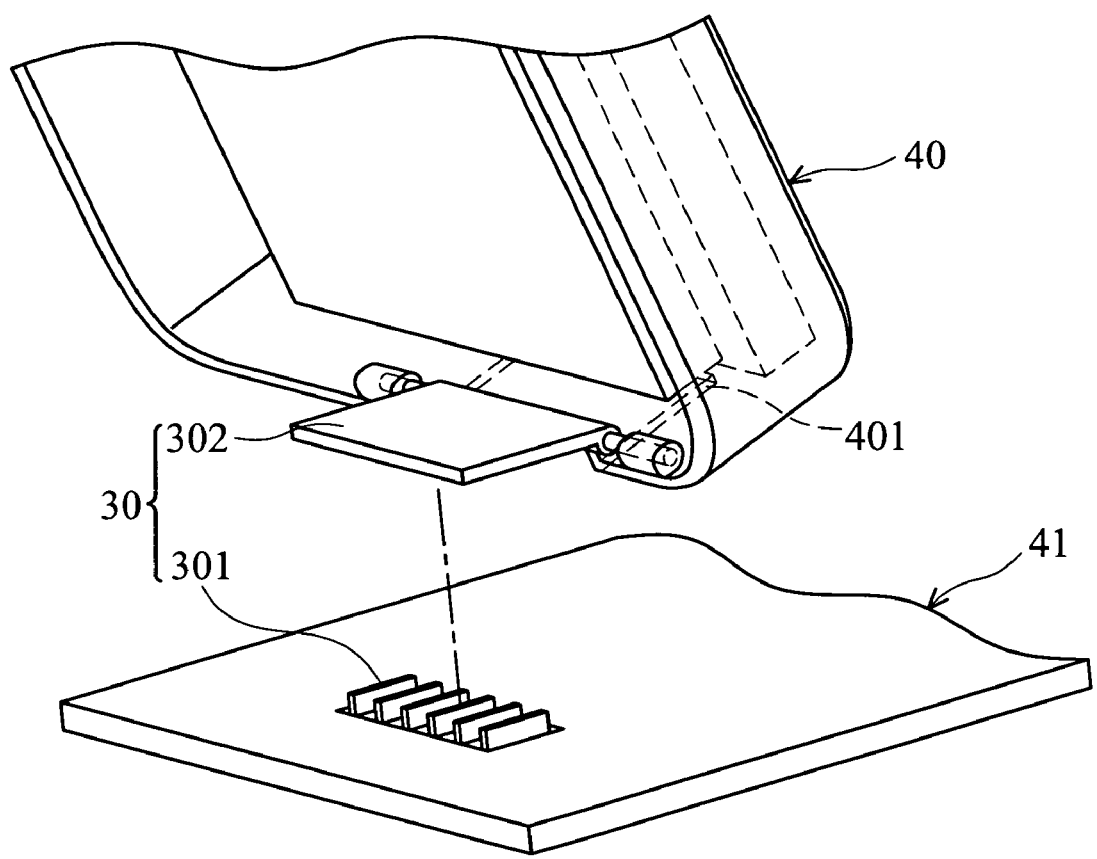
FIG. 3 is an exploded view of an electronic device of the invention and an input/output device.

In this embodiment, the electronic device connects to a detachable input device. The electronic device, for example, a personal digital assistant (PDA) 40, comprises a display for displaying the information and a controller to control the display to output the information. The input device may be a keypad or a memory. In this embodiment, the input device comprises a keypad 41. Referring to FIG. 3, the connecting mechanism 30 comprises a first connector 301 and a second connector 302. The first connector is installed on the keypad 41. The second connector 302 is installed on the personal digital assistant (PDA) 40. The personal digital assistant (PDA) 40 electrically connects to the keypad 41 to transmit the data via the first connector 301 and the second connector 302. A magnetic interaction between the first connector 301 and the second connector 302 provides the personal digital assistant (PDA) 40 to attract the keypad 41. Moreover, the connecting mechanism connects to an electronic device and an output. The output may be a display or an amplifier.

In detail, the first connector 301 comprises a magnet and the second connector 302 comprises a metal element to pivot on the bottom of the personal digital assistant (PDA) 40. The personal digital assistant (PDA) 40 gradually approaches the keypad 41. The magnetic field is generated between the personal digital assistant (PDA) 40 and the keypad 41. The personal digital assistant (PDA) 40 attracts the keypad 41 until the personal digital assistant (PDA) 40 connecting to the keypad 41.

Figure 4A:
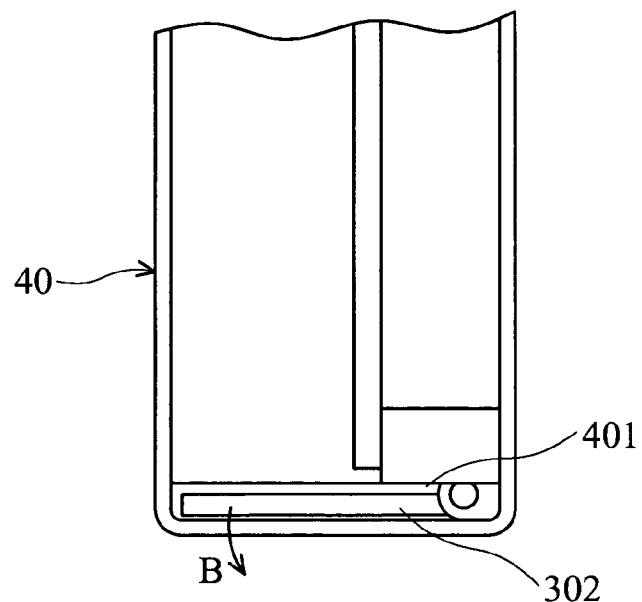
FIGS. 4A to 4C are schematic views showing an electronic device connected to an input/output device.
Figure 4B:
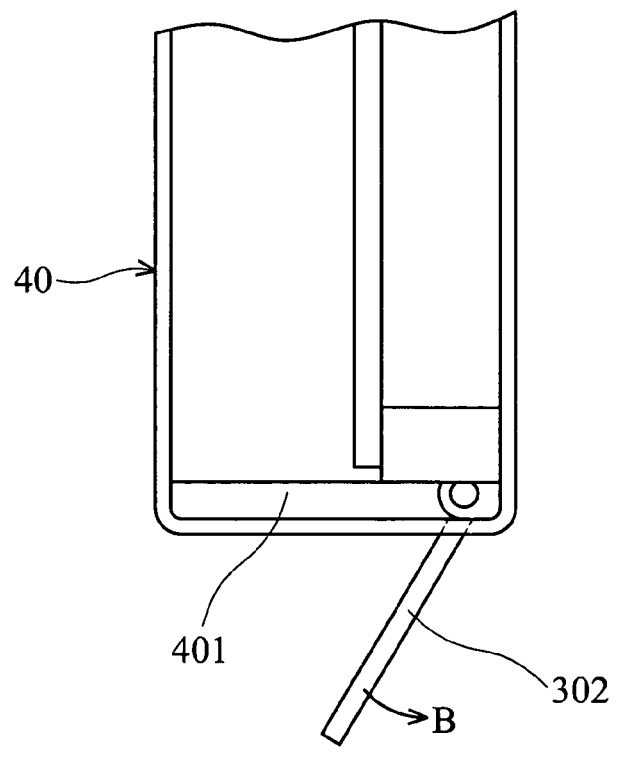
Figure 4C:
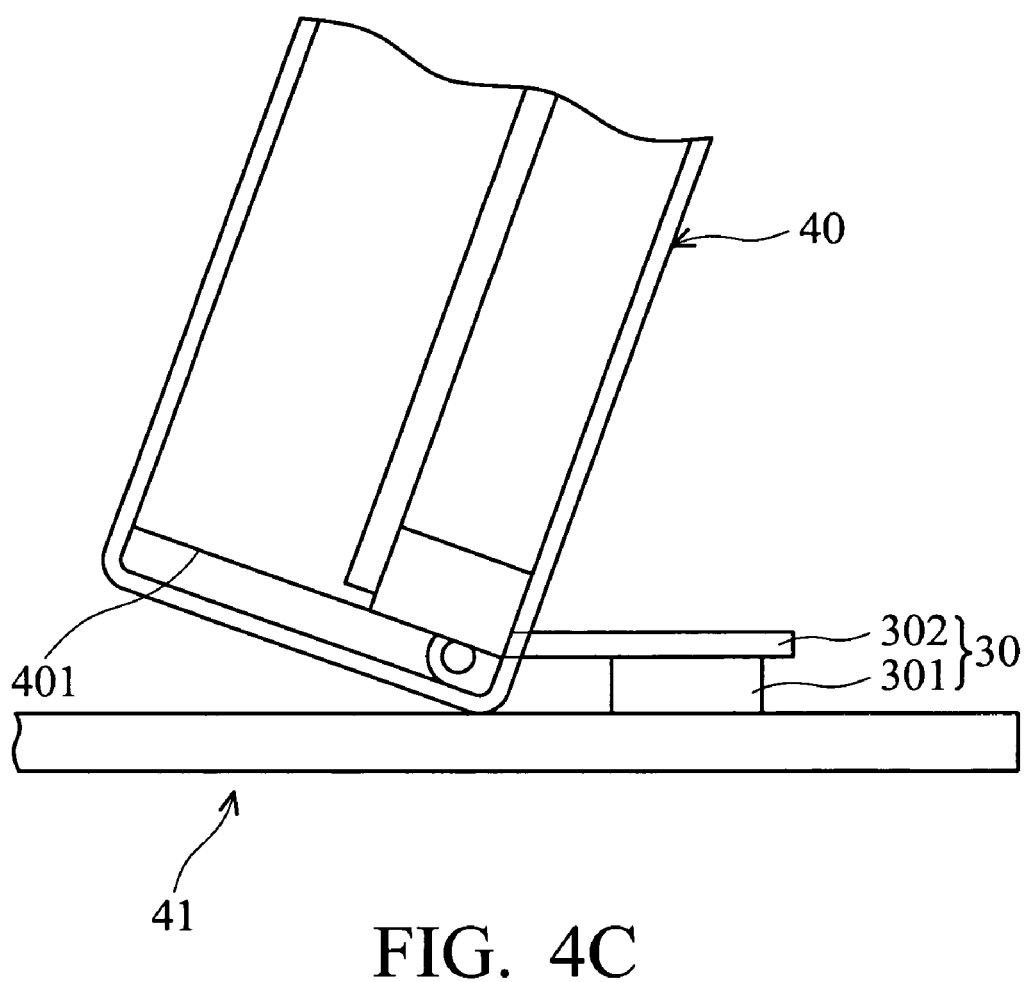

Referring to FIG. 4A, a container 401 is installed on the bottom of the personal digital assistant (PDA) 40. When the personal digital assistant (PDA) 40 does not connect to the keypad 41, the container 401 contains the second connector 302. Referring to FIG. 4B, if a user uses the personal digital assistant (PDA) 40 to connect to the keypad 41, the second connector 302 is rotated along an arrow B to leave the container 401. The personal digital assistant (PDA) 40 gradually approaches the keypad 41. The magnetic field is generated between the personal digital assistant (PDA) 40 and the keypad 41. The personal digital assistant (PDA) 40 attracts the keypad 41 until the personal digital assistant (PDA) 40 connects to the keypad 41 (shown in FIG. 4C).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a body, comprising a display and a container;
   a detachable input device, electrically connecting to the body, wherein the detachable input device comprises a keyboard; and
   a connecting mechanism, comprising a first connector and a second connector respectively installed on the body and the detachable input device;
   wherein the first connector connects to the second connector via a magnetic interaction;
   the first connector is pivoted on the container, the container contains the first connector, and the first connector is plate-shaped; and when the first connector is rotated from the container, the first connector is fixed to the second connector via a magnetic interaction, and the body stands inclinedly on the detachable input device.

2. The electronic device as claimed in claim 1, wherein the first connector comprises a magnet.

3. The electronic device as claimed in claim 1, wherein the first connector comprises a metal element.

4. The electronic device as claimed in claim 1, wherein the first connector comprises a magnet and the second connector comprises a metal element.

* * * * *